Aug. 23, 1960

H. E. ALBRIGHT
RECORDER 2,950,164

Filed Dec. 8, 1955

Inventor:
Harry E. Albright
by, Richard E. Horley
His Attorney

Inventor:
Harry E. Albright
by, Richard E. Horley
His Attorney

Aug. 23, 1960

H. E. ALBRIGHT 2,950,164

RECORDER

Filed Dec. 8, 1955

Inventor:
Harry E. Albright
by. Richard E. Hosley
His Attorney

Aug. 23, 1960
H. E. ALBRIGHT
2,950,164
RECORDER
Filed Dec. 8, 1955
4 Sheets-Sheet 4
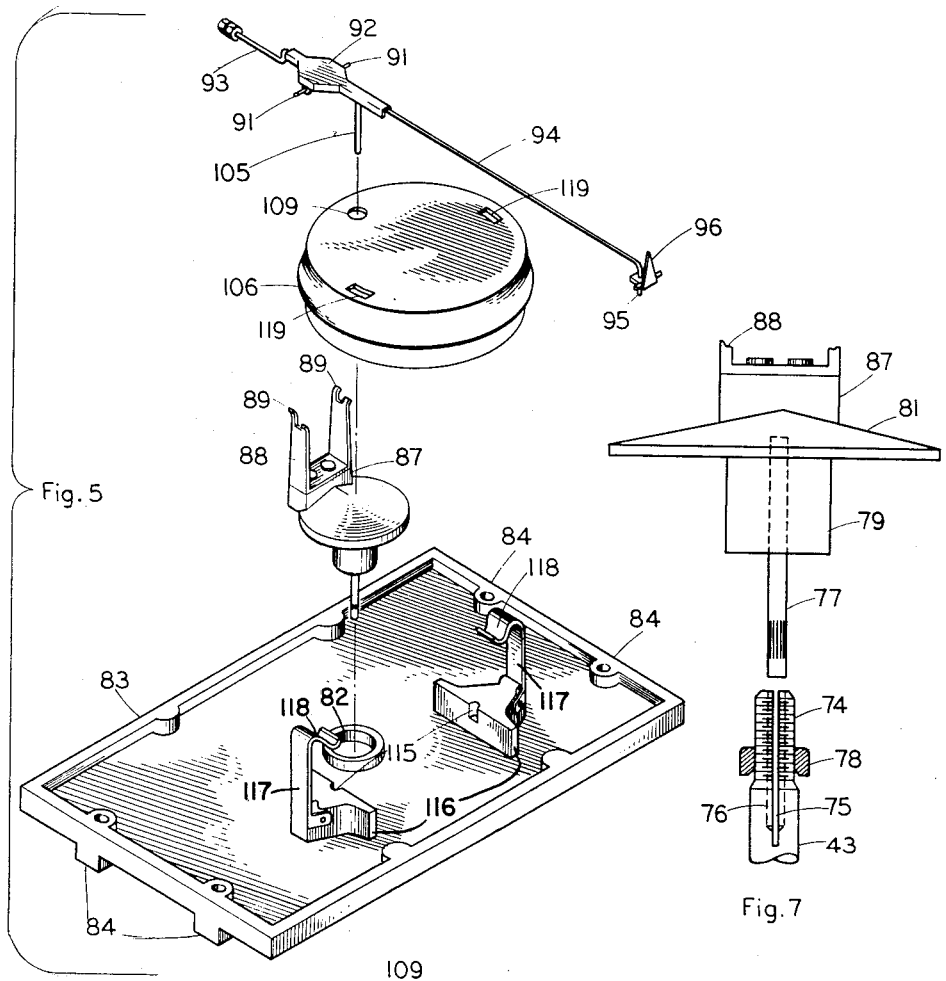
Inventor:
Harry E. Albright
by, Richard E. Horsley
His Attorney

United States Patent Office 2,950,164
Patented Aug. 23, 1960

2,950,164
RECORDER

Harry E. Albright, Marblehead, Mass., assignor to General Electric Company, a corporation of New York Filed Dec. 8, 1955, Ser. No. 551,769

5 Claims. (Cl. 346—140)

This invention relates generally to improvements in recording apparatus and more particularly to improvements in a strip chart recorder having an ink writing recording pen actuated by measuring means responsive to electrical quantities.

Through the years, the most popular form of recorder in use has been the direct writing recorder in which an inking system is utilized to provide the record produced by the recorder. Normally, in such direct writing recorders, the recording pen is driven directly by the measuring device and on the whole this type of recorder is the simplest and the least expensive of the many types of recorders that have been heretofore proposed for use. However, the use of ink has always imposed limitations on the use of such recorders in that it is necessary to continuously replenish the ink supply and it is also essential to frequently check the inking system to be sure that the ink is flowing freely and smoothly. Furthermore, in the case of portable recorders, the possibility of ink spillage during handling of the equipment requires that considerable care be exercised in handling, lest there be any undesirable spillage. In addition, the problem of replenishing the ink supply, being on first consideration a rather simple problem to solve, is in reality a rather complex problem in that the recorder must be designed to provide ready access to the interior of the recorder without unduly adding to the size or complexity thereof, while at the same time it must be designed to minimize the possibility of damage to its critical working parts through any ink spillage occurring during replacement of the ink supply. This problem is further complicated in the case of recorders measuring electrical quantities, because the users of the equipment, when attempting to replenish the ink supply, must ordinarily bring their hands in close proximity to the electrical measuring device, thus exposing themselves to possible shocks if they do not exercise the proper degree of care.

In addition to the troublesome problems encountered with the inking system in a direct writing recorder, it is also quite a problem to provide simple and effective means to adjust the zero reference position of the recorder, particularly where the writing components of the recorder are intended to cooperate with a variety of interchangeably mounted measuring devices. Thus, to achieve any degree of flexibility in the use of such a strip chart recorder, it is necessary to provide some means to set the zero reference position at the left-hand margin of the chart, at the right-hand margin of the chart or in the middle of the chart. Since the recording pen and its associated inking system are directly actuated by the moving components of the electrical measuring device, it is apparent that the zero setting mechanism must be arranged in such a way that its function can be effectively performed for all measuring mechanisms used, without interfering with the normal functioning of the writing components. Furthermore, since the measuring devices are usually mounted behind the chart moving components, it is important that adjustment of the zero setting mechanism be performed at the front face of the recorder without requiring the removal or rearrangement of other parts of the recorder.

Finally, it is important that any improvements in the writing system, including the zero reference adjusting means, which give rise to both improved performance and easier and more simplified servicing of the recorder, do not at the same time give rise to more complicated manufacturing techniques that result in substantially higher manufacturing costs.

It is, therefore, a primary object of this invention to provide an improved direct writing recorder, in which an inking system is used to produce the desired record.

It is another object of the invention to provide an improved inking system in a direct writing recorder in which the problem of ink spillage is virtually eliminated.

It is yet another object of the invention to provide, in a direct writing recorder, an improved inking system in combination with novel protective barriers serving to minimize damage to the critical components of the recorder and to minimize the possibility of injuries to anyone using the recorder.

It is a further object of the invention to provide, in a direct writing recorder, an improved inking system in combination with a novel mechanism for facilitating and simplifying the adjustment of the zero reference position of the recorder.

Briefly, and in one aspect, the invention comprises the use of a disposable covered inkwell removably mounted on a protective barrier that overlies the critical components of the electrical measuring means forming a part of the recorder. The moving system of the electrical measuring device has been specially adapted to cooperate with the disposable inkwell and a variety of interchangeably mounted electrical measuring devices. An adjustable member located proximate to the front face of the recorder and connected to the moving system of the measuring means by a flexible shaft is utilized to control the zero reference position of the recorder. The recording pen utilizes a capillary ink feeding tube to draw the ink from the inkwell to the writing tip and a portion of this tube at its intake end is arranged along the pivot axis of the pen in such a way that only a very small aperature need be provided in the inkwell cover to accommodate the intake portion of the ink feeding tube.

The inkwell itself is a relatively thin, wide, cylindrical body readily mounted in its proper position within the recorder and rigidly held in place by a novel clamping arrangement. The recording pen and its associated ink feeding tube are mounted in such a way that they may be easily removed to permit replacement of the inkwell when its ink supply is depleted.

The objects of the invention, as well as its benefits and advantages, together with other objects and advantages, will be apparent upon reference to the detailed description of the invention set forth below, particularly when taken in conjunction with the drawings annexed hereto in which:

Figure 5 is an exploded view in perspective of the inking system forming a part of the subject invention.

Figure 6 is an enlarged cutaway view of the novel covered inkwell forming a part of the subject invention and;

Figure 7 is an enlarged view illustrating the manner in which the inking system is coupled to the moving element of the electrical measuring device.

Figure 1:
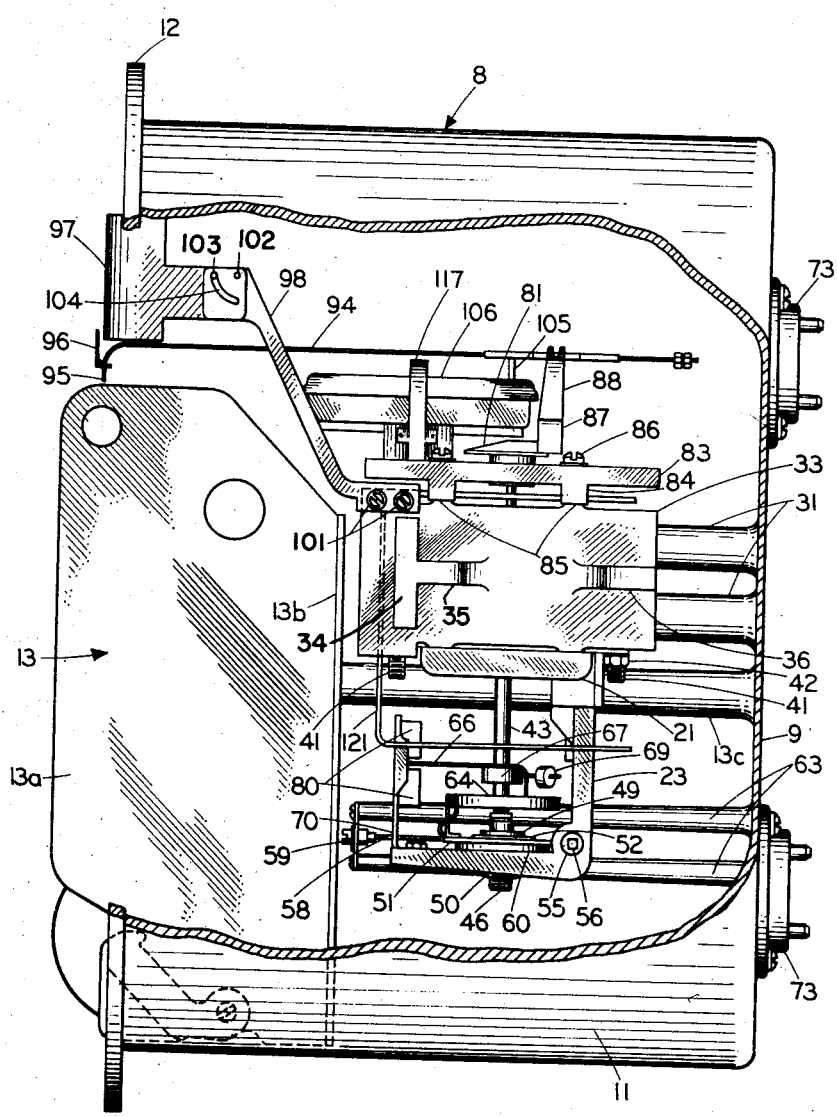
Figure 1 is a side view in elevation of a strip chart recorder embodying the invention, with a portion of the recorder housing cut way to more clearly show the manner in which the parts forming the invention are mounted within the recorder.
Figure 2:
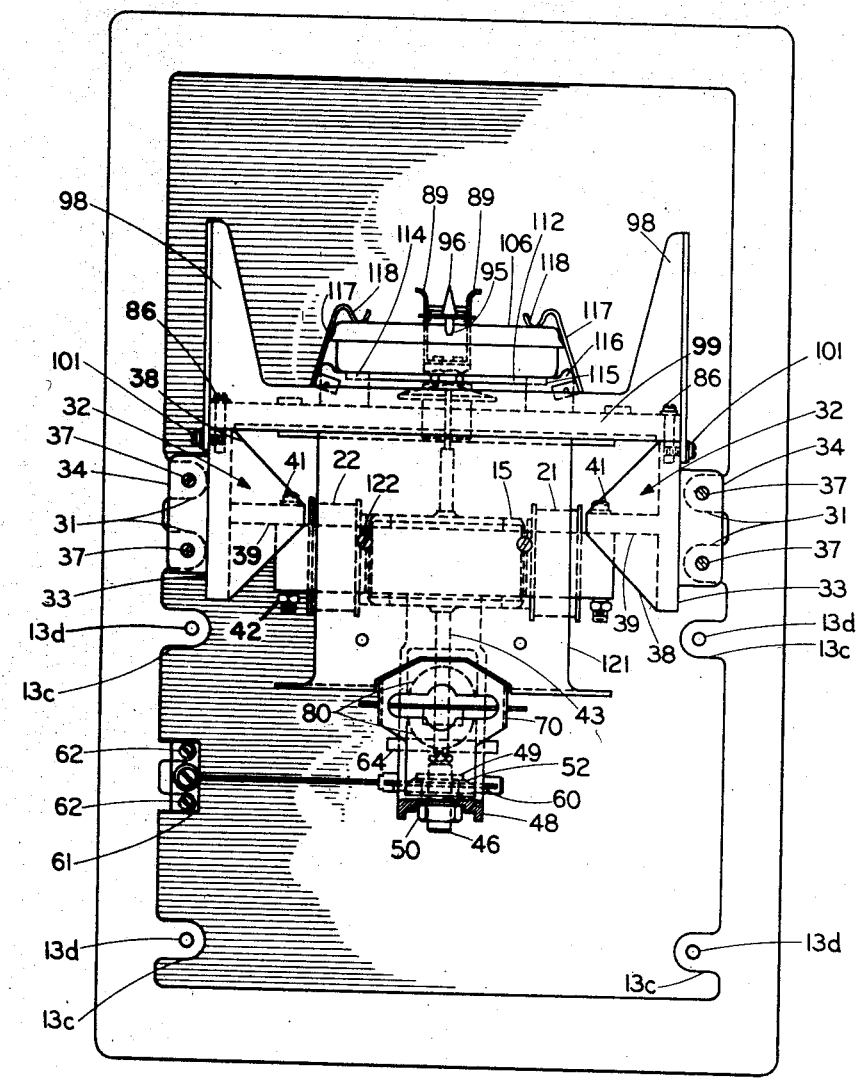
Figure 2 is a front view in elevation of the recorder shown in Figure 1, with a portion in section and with the chart carriage assembly removed to further illustrate the arrangement of the parts forming the invention.

Referring first to Figures 1 and 2, it is seen that the recorder comprises a housing 8 having a closed inner wall 9 formed integrally with its side walls 11 which in turn extend rearwardly from a flange 12 surrounding its open front face. The flange 12 may be adapted to receive a cover, one that is either bolted on or is in the form of a hinged door, but the recorder is illustrated with the cover removed to better show the parts mounted within the recorder housing.

This housing forms a receptacle or casing for the component parts of the recorder, one of which is the chart carriage assembly 13 indicated more or less diagrammatically in Figure 1 and extending across the front face of the recorder housing. This chart carriage assembly may be of any conventional design well understood by those skilled in the art and since it forms no part of the subject invention, a detailed description thereof has been omitted in the interests of brevity. Suffice to say that a chart initially formed into a roll is adapted to be rotatably mounted in the chart carriage assembly and guided through the assembly at a controlled rate by suitable chart driving devices, after which it is rewound on a conventional takeup roll also journaled for rotation in the chart carriage assembly. The driving mechanism for the chart can be an electric drive motor or a spring wound drive motor, either one of which is adapted to be a component part of the chart carriage assembly, including all necessary gears and other means coupling the drive units to the chart itself.

All of the aforesaid chart carriage components are carried by a main framework consisting of a pair of spaced side plates, one of which is shown at 13a, rigidly attached to a back plate overlapping the sides to form suitable mounting flanges. These flanges abut the outer ends of bosses 13c formed integrally with the side walls of the housing, and apertures in the flanges aligned with the threaded apertures 13d in the outer ends of the bosses permit the chart carriage assembly to be securely, but removably attached to the housing, by suitable screws.

As is best illustrated in Figure 1, the measuring means, which together with the inking system form the writing components of the recorder, are located within the recorder behind the chart carriage assembly 13.

Figure 3:
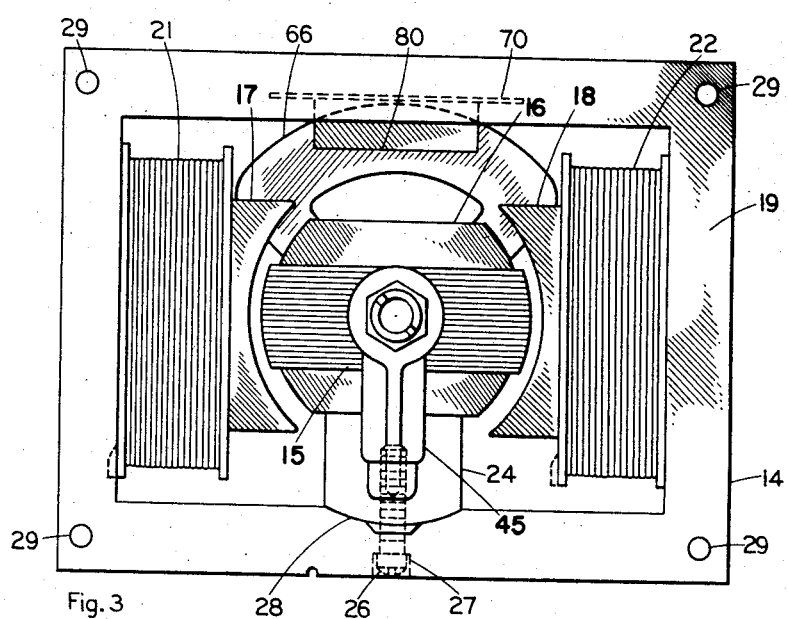
Figure 3 is a top view of one form of electrical measuring means that may be used with the invention.
Figure 4:
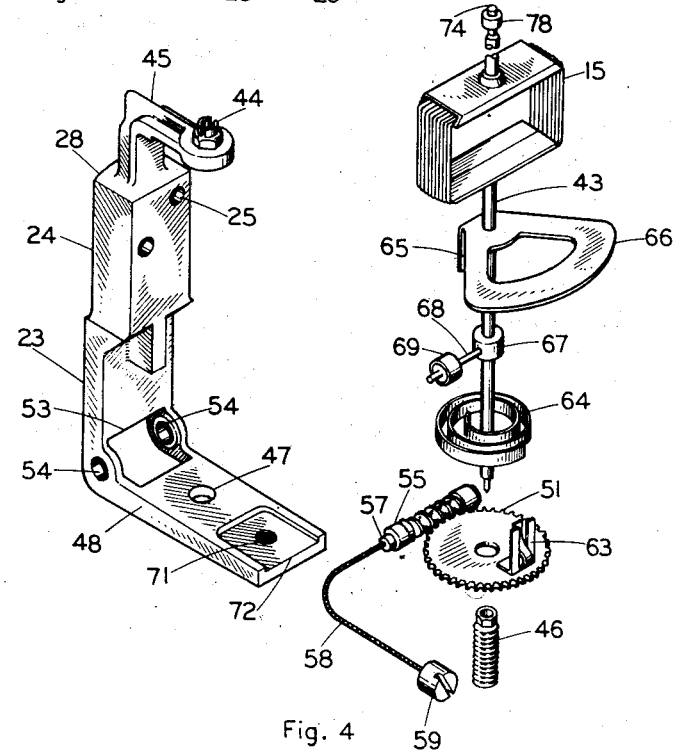
Figure 4 is an exploded view in perspective of the moving system used with the electrical measuring device shown in Figure 3, illustrating the novel arrangement used for setting the zero reference position of the recorder.

Considering first the measuring means and upon further reference to Figures 3 and 4, it is seen that the measuring means in the illustrated embodiment is in the form of a dynamometer type of A.C. voltmeter comprising a substantially rectangular field structure 14 surrounding an armature 15 which has its opposite edges moving in the air gaps formed between the centrally disposed core 16 and the inwardly projecting poles 17, 18. The field structure 14 includes the outer rectangular shaped sections 19 formed from a series of stacked laminations suitably fastened together by means of rivets or the like and which may have integral therewith the pole pieces 17, 18, surrounding which are the identical field coils 21, 22.

The core 16 is properly supported relative to the pole pieces 17, 18 by means of a substantially L-shaped frame 23 having the core supporting section 24 in which is provided the apertures 25 through which a pair of threaded bolts may be inserted for engagement with cooperating threaded apertures in the core 16. The frame 23 is in turn supported relative to the field structure 14 by means of a pair of threaded bolts, one of which is indicated at 26 and is shown extending through a suitable counter-sunk aperture 27 provided in the rectangular laminations 19, after which it engages cooperating threaded apertures provided on the outer arcuate face 28 of the core section 24.

Each of the corners of the field structure 14 is provided with identical apertures 29 utilized for positioning the measuring device within the recorder in a manner to be more fully discussed below.

Returning now to Figures 1 and 2, it is seen that the inner surface of the housing side walls 11 are provided with a pair of bosses 31 extending substantially parallel to the base from the rear wall of the housing to a point approximately midway between the rear wall and the front face of the housing. In Figure 1, the portions of the bosses 31 which show are the rear portions of the bosses situated on the left side of the recorder as viewed in Figure 2. Cooperating with these bosses are a pair of identical molded support members 32 formed from a suitable electrical insulating material having substantially rectangular side sections 33, from which extend the outwardly projecting rectangular ears 34. The side walls 33 also have a pair of webs 35, 36 extending outwardly therefrom and disposed at right angles to the ears 34, the web 35 being formed as an integral part of ears 34.

The webs 35, 36 are intended to lie between the bosses 31 and thus cooperate therewith to support the members 32 within the recorder housing. To retain the members 32 in a fixed position within the housing, the inner ends of the bosses 31 are provided with suitable threaded apertures which are intended to cooperate with screws 37 passing through corresponding apertures provided in the ears 34.

Projecting inwardly from the side walls 33 at each end thereof are the triangular shaped sections 38 from which project inwardly, midway thereof and at right angles thereto, suitable apertured ears 39. Each of these ears is adapted to overlie the upper surface of the corners of the magnetic frame structure 14 such that the apertures in the ears and the frame are in line to permit the insertion of threaded bolts 41 which in cooperation with the nuts 42 mounted on their outer ends rigidly secure the magnetic structure to the support members 32.

From the above, it is seen that the field structure for the measuring device is rigidly supported within the recorder housing and it is to be further noted that this structure includes a frame 23 which in turn provides the necessary support for a shaft 43 to which the armature coil 15 is rigidly secured.

The upper end of shaft 43 is journalled by a sleeve bearing 44, in a manner to be more fully described below, mounted on the bearing arm 45 formed as an integral part of frame 23, and the lower end of shaft 43 is journalled in a jewelled instrument bearing 46 having its external surface in the form of a threaded shank passing through the centrally located aperture 47 provided in the base member 48, also formed as an integral part of frame 23.

As is best shown in Figure 2, where part of frame base 48 has been cut away to show a partial section through aperture 47, a shouldered sleeve 49 surrounds the bearing 46 and extends through the base member 48 to which it is staked on the inner surface thereof. The sleeve 49 is internally threaded to cooperate with the threaded shank portion of the bearing 46 and a lock nut 50 is provided to clamp the jewel bearing member securely in place.

The shouldered sleeve 49 serves as a bearing for a worm wheel 51 held between a collar 60 resting on the upper surface of the base member 48 and the shoulder portion of the sleeve 49 by means of a spring washer 52. The frame 23 is cut away at 53 where the base 48 forms a junction with the remainder of the frame and the portions remaining in the junction where the frame is cut away are provided with oppositely disposed apertures 54 which serve as suitable bearings for a nylon worm 55 mounted therein. The outer faces of the worm projecting beyond the apertures 54, may be provided with square shaped recesses, one of which is intended to cooperate with a square plug 57 carried on the inner end of a flexible shaft 58. The outer end of shaft 58 is affixed to a transversely slotted head 59 rotatably supported within a bracket 61 attached to the housing by means of a pair of screws 62 which threadably engage the inner ends of a pair of bosses 63 formed integrally with the side wall of the housing.

The head 59 is contiguous to one of the mounting flanges of the chart carriage assembly 13 and to permit manipulation of the head from the front face of the recorder without removal of the chart carriage assembly, the mounting flange is cut away to provide access to the head 59.

From the above, it is apparent that any manipulation of the head 59 will cause the worm wheel 51 to be rotated with respect to shaft 43 and this effect is utilized to adjust the zero reference position of the shaft 43. Rigidly attached to the worm wheel 51 is a clamping bracket 63 adapted to receive the outer end of a spiral control spring 64 concentrically arranged around the shaft 43, the spring having its inner end rigidly attached to the tab 65 depending from the damping vane 66. The vane 66 is in turn rigidly connected to a collar 67 which surrounds shaft 43 and is connected thereto by suitable set screws or the like. A threaded arm 68 extends from collar 67 on which may be adjustably mounted a suitable counterweight 69.

It is thus apparent that the worm wheel 51 is coupled to shaft 43 via the bracket 63, spring 64, tab 65 and collar 67 so that rotation of the worm wheel will cause the outer end of the control spring 64 to be moved angularly with respect to the shaft and thus rotate the shaft for establishment of a zero reference position.

Cooperating with the damping vane 66 are a pair of C-shaped permanent magnets 80 disposed on opposite sides of the vane and supported relative to the vane by means of a bracket 70 attached to the frame base 48 by a screw 69 engaging the threaded aperture 71 located centrally in the recess 72 provided in the base to receive the base portion of the bracket 70.

The field coils 21, 22 and the armature 15 are provided with suitable leads which may be connected to one of the electrical plugs 73 provided on the rear wall of the housing, the plug in turn being adapted for connection to the external circuit to be measured by the recorder. Any conventional method of securing the leads to the coils and the armature may be used, as such arrangements are well understood by those skilled in the art, the precise connections being omitted in the interest of clarity. In the case of the armature coil, the usual spiral connectors may be used.

From the above, it is now apparent that when the field coils and the armature coil are properly energized, the armature coil will assume a position in the air gap corresponding to the magnitude of the voltage being measured in the external circuit connected thereto. In so assuming such a position, the shaft 43 will be rotated and this angular motion of shaft 43 will be utilized to produce a record of the voltage being measured in a manner to be more fully described below.

Thus, as is best shown in Figure 7, the upper portion of shaft 43 terminates in a threaded extremity 74 below the bearing 44 and this extremity is slotted at 75 and also has an inwardly extending bore 76 adapted to receive the knurled end of bearing shaft 77 which extends through bearing 44, the parts being securely clamped together by means of the lock nut 78.

The bearing shaft 77 extends from a hub 79 depending from a substantially cone-shaped auxiliary protective barrier 81, the hub and cone-shaped section being integral and formed of a suitable electrical insulating material molded around the auxiliary shaft.

The cone-shaped barrier has its hub 79 extending through a shouldered aperture 82 provided in a main protective barrier 83, the hub and aperature being arranged coaxially with respect to shaft 43. The main protective barrier 83 is also formed by molding a suitable electrical insulating material and it is seen that it is in the form of a shallow rectangular trough having oppositely disposed pairs of apertured mounting feet 84 intended to rest upon the support members 33. The upper edges of members 33 are provided with oppositely disposed pairs of raised portions 85, each of which has an internally threaded aperture intended to cooperate with suitable screws 86 which pass through the main barrier feet 84 and serve to clamp the main barrier to the support members 33.

It is to be noted that cone overlies the aperture 82 and together with main barrier 83, completely overlies the measuring mechanism, thus serving as a protective shield preventing dirt or ink from falling into the measuring system while at the same time serving as an insulating barrier protecting anyone reaching into this part of the housing from the electrical components below the barrier.

The auxiliary barrier 81 has a boss 87 formed integrally on its conical portion and this boss supports a pen holder bracket 88 having a pair of arms formed with bifurcated extremities 89. The extremities 89 are adapted to receive the projecting pin shafts 91 extending outwardly from the pin arm bracket 92, from the rear of which extends an adjustable counterweight 93 and from the front of which extends the recorder pen in the form of a capillary ink feeding tube 94. The outer end of tube 94 is turned down to form a stylus or writing tip 95 and the tip also carries a pointer 96 adapted to cooperate with a suitable scale arranged on a scale bracket 97 disposed above the pen at the front face of the recorder. The scale bracket 97 is supported at its opposite ends by the arms 98 formed as a part of bracket 99 attached to the support members 33 by screws 101. The plate 97 is pivotally mounted on arms 98 by means of the pivot shaft 102, the limits of its pivotal motion being established by the pin 103 attached to the scale bracket and moving in a slot 104 provided in the extremities of arms 98.

The inner end 105 of capillary tube 94 is turned downwardly and extends coaxially with respect to the shaft 43. This portion of the tube forms the intake end of the tube and is adapted to coperate with the covered inkwell 106 from which it draws ink to the writing tip by capillary action.

The covered inkwell 106 is in the form of a flat cylindrical molded body shown as comprising a two-piece member having a base 107 and a cover 108 sealed thereto. Cover 108 has the aperture 109 arranged to receive the intake 105 and the open end of the intake tube extends down into a recess 111 provided in the base of the inkwell. The inkwell base 107 is also provided with the V-shaped channels 112 and the straight channel 113, all of which converge into the recess and have their bottom surfaces inclined from the recess whereby ink contained in the well will at all times tend to drain into the recess. The V-shaped channels 112 are formed externally as a pair of V-shaped tongues which project downwardly from the bottom surface of the inkwell base 107 and the outer tips 114 of these tongues are intended to rest in the oppositely disposed grooves 115 provided in the inkwell supporting pedestals 116 formed as an integral part of main barrier 83. The parts are dimensioned such that the tongues project into the grooves and allow diametrically opposed portions of the bottom surface of inkwell base 107 to rest upon the upper surfaces of pedestals 116. A pair of clamping members 117 are pivotally mounted on the pedestals 116 and have their outer ends in the form of resilient bows 118 intended to snap in the wedge-shaped cutouts 119 to form a detent therewith serving to securely clamp the covered inkwell in place.

With the inkwell clamped in place and the recording pen mounted on the bracket 88, it is apparent that ink will be continuously drawn from the inkwell to the writing tip of the recorder pen and the angular motion of shaft 43 will be transmitted to the pen by the bracket 88. In this way, the pen will at all times follow the motion of the shaft 43 and continuously trace a record of the magnitude of voltage being measured by the voltmeter mechanism.

The covered inkwell is normally furnished completely sealed, there being a suitable protective covering overlying the aperture 109 so that it may be stored indefinitely until such time as it is used. When the inkwell in the recorder runs dry, it is easily replaced by merely rotating the scale bracket 97 upwardly within the housing, lifting the pen arm off of the bracket 88, disengaging the clamping members 117, and then simply lifting the inkwell out of the recorder and disposing of same. A fresh inkwell can readily be inserted in place, after which the parts are reassembled to their original position and the recorder is once again ready to operate. Because of the compact arrangement of the parts forming the inking system and the manner in which they are mounted within the recorder, ready access to these parts is available without unduly enlarging the recorder housing.

Additionally, with the zero reference setting mechanism coupled to the lower end of shaft 43 and the recording pen coupled to the upper end of shaft 43, it is apparent that adjustment of the control spring 64 is readily done without in any way interfering with the normal functioning of the inking system. The inking system components can remain intact whenever the control spring 64 is adjusted; as a matter of fact, this adjustment does not require the removal or rearranging of any components of the recorder, except for the front cover of the recorder housing, which obviously must be opened or removed to permit access to head 59.

Although the invention has been illustrated with a dynamometer type of A.C. voltmeter mechanism as its electrical measuring means, it is to be understood that other forms of measuring mechanisms may be used with equal facility. For example, the voltmeter mechanism may be replaced by a D.C. milliammeter of the permanent magnet, moving coil type, or an A.C. ammeter of the iron vane type, or an A.C. single-phase wattmeter of the dynamometer type, or by an A.C. polyphase wattmeter of the dual dynamometer type. With all such mechanisms, the support members 32 are adapted to serve as mounting arrangements, and the measuring mechanism includes a frame similar to frame 23 by which the moving shaft of the measuring mechanism is supported in a manner identical with the supporting arrangement of shaft 43.

With all such mechanisms, the support members 32 and the barriers 81 and 83 substantially enclose the measuring devices, and in the case of A.C. measuring mechanisms, a magnetic shield is used, shown as the substantially U-shaped shield 121 having its base mounted on the field frame 14 by means of suitable screws 122 or the like, and its side legs extending over and under the measuring mechanism, these legs being suitably slotted to accommodate the frame 23, shaft 43, and the hub 79.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In a recorder, the combination of: a housing, electrical measuring means supported within said housing and including a vertically extending rotatably mounted shaft, means enclosing said measuring means including a main protective barrier overlying said measuring means, said barrier having an aperture disposed coaxially with respect to said shaft, an auxiliary protective barrier overlying said aperture and having a portion thereof extending through said aperture, said auxiliary barrier being coupled to said shaft to rotate therewith, a recording pen removably and independently mounted on said auxiliary barrier, said pen having a capillary ink feeding tube having its inner end disposed vertically within said housing and arranged coaxially with respect to said shaft, and a closed inkwell removably mounted on said main barrier and having an aperture disposed in its cover for receiving the inner end of said capillary tube.

2. In a recorder of the type having electrical measuring means supported within a housing and means enclosing said measuring means including a main protective barrier overlying said measuring means, a vertically extending rotatable shaft associated with said measuring means, and an aperture in said barrier disposed coaxially with respect to said shaft, an auxiliary protective barrier overlying said aperture and having a portion thereof extending through said aperture, said portion being rigidly fastened to the upper end of said shaft whereby said auxiliary barrier rotates with said shaft, a recording pen removably mounted on said auxiliary barrier, said pen having a capillary ink feeding tube having its inner end disposed vertically within said housing and arranged coaxially with respect to said shaft, and a covered inkwell removably mounted on said main barrier and having an aperture disposed in its cover for receiving the inner end of said capillary tube, said main barrier having a pair of spaced apart pedestals on which said inkwell is mounted, said pedestals having opposed grooves therein, said inkwell having a tongue projecting downwardly from its bottom and adapted to nest in said grooves.

3. The combination defined in claim 2 wherein each of said pedestals include pivotally mounted clamping members adapted to engage the cover of said inkwell to hold said inkwell firmly on said pedestals.

4. The combination defined by claim 3 wherein said clamping members have resilient bowed ends and said inkwell cover has a pair of spaced wedge-shaped cutouts therein, said bowed ends cooperating with an inclined surface of said cut-outs to form a detent clamping arrangement.

5. The combination defined by claim 4 wherein said inkwell is in the form of a relatively thin cylindrical container having a plurality of channels formed in the inner side of its base, all of said channels converging in a common recess proximate to one end of said container and also in the inner side of said base and located opposite said cover aperture, said channels having their bottom surfaces inclined downwardly into said recess whereby the ink in said inkwell drains into said recess as it is used.

References Cited in the file of this patent

UNITED STATES PATENTS

| 607,993 | Higgins | July 26, 1898 |
|---|---|---|
| 899,043 | Harris | Sept. 22, 1908 |
| 1,599,268 | Angus | Sept. 7, 1926 |
| 1,907,096 | Angus | May 2, 1933 |
| 2,199,078 | Lindermann | Apr. 30, 1940 |
| 2,308,710 | Nichols | Jan. 19, 1943 |
| 2,312,990 | Miller | Mar. 2, 1943 |
| 2,392,487 | Lee | Jan. 8, 1946 |
| 2,396,538 | Schmied | Mar. 12, 1946 |
| 2,478,329 | Shaper | Aug. 9, 1949 |
| 2,529,557 | Keroes | Nov. 14, 1950 |
| 2,752,220 | Squier | June 26, 1956 |

FOREIGN PATENTS

| 573,027 | Germany | Mar. 27, 1933 |
|---|---|---|
| 576,575 | Germany | May 11, 1933 |